United States Patent Office 3,368,928
Patented Feb. 13, 1968

3,368,928
PRIMER COMPOSITION AND METHOD OF BONDING SILICONE RUBBER TO A METAL SURFACE SUSCEPTIBLE TO SULFIDE FORMATION
Rejenjra N. Chadha and Townsend H. Porter, Adrian, Mich., assignors to Stauffer Chemical Company
No Drawing. Filed July 6, 1964, Ser. No. 380,646
8 Claims. (Cl. 148—6.2)

ABSTRACT OF THE DISCLOSURE

Method of increasing the reception of a metal surface for silicone rubber which consists of coating the metal surface with a solution of a hexavalent chromium compound and then with a primer composition. The primer composition consists of a liquid alkylpolysilicate, boric acid or an alkyl borate and a mutual solvent. The method is particularly applicable to metal surfaces which are to be subjected to the influence of hot oils containing sulfur in a form reactable with the metal.

---

This invention relates to a method of treating metal surfaces. More particularly, this invention relates to a method of preparing metal surfaces to accept primers for silicone rubber.

The use of silicone rubber as a metal coating has proved especially valuable where the coating is in contact with hot oil. In order to utilize most silicone rubber stocks for coating purposes, it is necessary to prime the surface to be coated to make possible a tenacious void-free bond. A great deal of effort has been expended in the development of satisfactory primers. Originally, these primers were chlorosilanes, which were applied to metal surfaces and hydrolyzed, leaving an essentially monomolecular layer of siloxane to which silicone rubber would adhere. It was commercially desirable, however, to find liquid primers which were relatively innocuous to handle and which merely required application and drying. As silicone technology advanced, silicates such as ethylorthosilicate and ethylpolysilicate were tried, but these were found to be undependable. Consequently, essentially all the silicone primers presently employed are based on fluid organo-substituted siloxanes.

While all the present commercial silicone primers have proved to be very good, they have not been completely dependable. When these primers have been employed in conjunction with silicone rubber as a metal surface coating and the coated metal has been immersed in certain hot hydrocarbon oils, there have been occasional failures in the rubber-to-metal bond. These failures have been caused, apparently, by the presence in the oils of components either naturally present or included as additives. These components appear to contain sulfur in an oxidized state, e.g. as a sulfate, sulfite or sulfonate. A typical example of such components has been a sulfonated sperm oil present in amounts from about 0.5 to about 5% by weight based on the weight of the oil composition.

One of the objects of this invention is to provide a method for protecting metal surfaces. Another object is to provide a method for preparing metal surfaces so that silicone rubber can be bonded to these surfaces and the bond will withstand the effect of hot oils containing sulfur in an oxidized state. Another object of this invention is to make possible the use of less sophisticated primers than those presently in use. Another object is to provide a system which will accomplish these ends in a simple commercially-acceptable manner. These objects, as well as others which are apparent from the following description, are satisfied by this invention.

This invention is a method of treating a solid surface, especially the surface of a metal susceptible to sulfide formation, which comprises applying thereto a solvent solution of from about 0.05 to about 2 percent, preferably no more than about 1 percent, by weight based on the weight of the solution of chromium added as a soluble hexavalent chromium compound, said solvent having a boiling point less than about 90° C., and allowing the surface to dry.

The hexavalent chromium compound is generally an alkali metal dichromate such as sodium dichromate or potassium dichromate, but any soluble dichromate or chromate can be employed. Chromic acid can even be employed, but it tends to oxidize the solvents, especially alcohols and ketones.

The solvents which can be employed in this invention can include any organic liquids having a boiling point less than about 90° C. They can be, for example, alcohols such as methanol, ethanol or isopropanol; ketones such as acetone or 2-butanone; hydorcarbon oils such as hexane, 3-methylpentane, 2,3-dimethylbutane or benzene; halogenated hydrocarbons such as carbon tetrachloride, chloroform, methyl iodide, ethylene chloride, ethyl bromide, isopropyl bromide or t-butyl bromide; or ethers such as butyl methyl ether, ethyl isopropyl ether, isopropyl ether, furan, tetrahydropyran or ethyl ether. Mixtures of these liquids can also be employed and may be desirable in dissolving the chromium compound. Organic liquids which boil at low temperatures such as 30° C. or lower can be used if the solution is kept cold or if they are present as part of a mixed solvent. Similarly, higher boiling liquids such as dioxane, perchloroethylene or water can be included in mixed solvents in amounts sufficiently small so that the resulting solvents have boiling points less than about 90° C.

One combination solvent which has been tried successfully has been a combination of acetone and water, wherein the acetone portion has ranged from about 60 to about 85 percent by weight of the total solvent. In order to achieve the optimum volatility, an acetone-water combination containing at least 70 percent by weight acetone is preferred.

The hexavalent-chromium-compound solution should have a pH of from about 3 to 8, preferably 3 to 6, depending on the solvent system for reasons of solution stability. Acids such as chromic acid, hydrochloric acid or acetic acid can be used.

Metal surfaces are presently washed with water after any other treatment such as pickling. The water-wet surfaces are subsequently washed with acetone to remove the water and make possible quick drying of the metal surface at essentially room temperature due to the volatility of the acetone. This invention can be used commercially by substituting the hexavalent-chromium-compound solution of this invention for the acetone wash presently in commercial use.

While the simplest means for applying the composition of this invention to a surface is by immersion of the surface in the composition, the composition can also be applied by other fluid handling techniques such as spraying, brushing or flooding.

The metal surfaces which can be protected by this invention are those susceptible to sulfide formation and include, for example, steel, zinc, iron, brass, tin, silver, lead and copper. The surface treatment of this invention prevents or inhibits rusting in any of its common forms such as, for example, oxidation, sulfide formation or chloride formation.

As an additional benefit of this invention, it has been found that metal surfaces which have been treated in accordance with this invention can be primed with most of the present commercial primers based on organo-substituted siloxanes and coated with silicone rubber by standard techniques, and the resulting bonds are far superior in resistance to the above-described hot oils than previously attainable bonds.

Furthermore, it has been found unexpectedly that certain compositions which had been previously tried as primers but which had been found to have inconsistent hot oil-resistance could be applied to metal surfaces treated with the hexavalent-chromium-compound solution described above and proved to have at least as good hot oil-resistance as any of the present commercial primers. These novel priming compositions were based on certain critical alkylpolysilicate compositions.

The most common alkylpolysilicate is ethylpolysilicate. Commercial fluid ethylpolysilicate contains up to about 40% by weight (about 29.3 mol percent) $SiO_2$, i.e. $SiO_{4/2}$ units, and has inconsistent adhesion and no hot oil resistance when used as a primer. It has been found that by using refined techniques, ethylpolysilicate can be prepared containing up to as high as 54% by weight (about 42 mol percent) or even 60% $SiO_2$ units by weight. Such ethylpolysilicates provide excellent adhesion as primers for silicone rubber on solid surfaces, especially on metal surfaces treated with the hexavalent-chromium-compound solution described above, but they have no hot oil resistance. However, these special ethylpolysilicates, i.e. those containing over 30 mol percent $SiO_2$, can be diluted with boron compounds in solvent solution producing primer compositions having both excellent adhesion and excellent hot oil resistance. It was also found that ethylpolysilicate containing about 45% by weight (about 33.5 mol percent) $SiO_2$ units was as effective as ethylpolysilicate containing a higher proportion of $SiO_2$ units and had less tendency to gel during preparation and use.

The degree of condensation of the alkylpolysilicates, exemplified by ethylpolysilicate, as indicated by the percentage of $SiO_2$ units is critical for their use as primers. The alkyl groups can be any alkyl groups containing up to about 12 carbon atoms, such as methyl, ethyl, propyl, butyl, hexyl, 2-ethylhexyl, decyl and dodecyl groups. However, the preferred polysilicates are methylpolysilicate, ethylpolysilicate and propyloplysilicate, each containing at least about 32 mol percent $SiO_2$ units and preferably at least about 33 mol percent $SiO_2$ units. The most commercially attractive polysilicate from considerations of cost and handling ease (including toxicity) is ethylpolysilicate.

The alkylpolysilicates employed herein can be prepared by such methods as those illustrated in U.S. Patent 2,799,693.

The polysilicates can be used undiluted or can be diluted with any suitable solvent, such as isopropyl alcohol, to as low as about 0.1% by weight polysilicate measured as ethylpolysilicate. Preferably, the polysilicate concentration in solvent is at least 0.5% by weight. As a practical matter, no more than about 2% by weight of polysilicate, measured as ethylpolysilicate, in solvent need be used for priming although a 10% or more by weight solution can be used.

The polysilicate can be extended or diluted with a boron compound such as boric acid or an alkyl borate, especially one in which each of the alkyl groups contain no more than three carbon atoms as in trimethylborate, triethylborate and tripropylborate. The boron compound can be present in an amount up to a boron-$SiO_2$ weight ratio of about 0.9 to 1, where the $SiO_2$ quantity is that in the alkylpolysilicate. In the boric acid-ethylpolysilicate (45 weight percent $SiO_2$ units) system this is equivalent to a maximum weight ratio of about 2.3 to 1. Preferably, the boron-$SiO_2$ weight ratio is no more than about 0.6 to 1, equivalent to a boric acid-ethylpolysilicate (45 weight percent $SiO_2$ units) weight ratio of about 1.5 to 1. The best combination to date by commercial tests consists of equal weights of boric acid and the ethylpolysilicate (45 weight percent $SiO_2$ units), 2 grams of each, in 96 grams of isopropanol. This is equivalent to a boron-$SiO_2$ weight ratio of about 0.4 to 1.

While the above-described alkylpolysilicates alone provide excellent adhesion of silicone rubber to metal, the surface of which has been treated with the hexavalent-chromium-compound solution and the described dilution or extension of the alkylpolysilicates with the described boron compounds does not appear to affect this adhesion, a boron compound is a necessary ingredient for hot oil resistance and for consistent adhesion where the primer is to be applied to a metal surface which has not been treated with the hexavalent-chromium-compound solution. Under such circumstances, it is necessary that the boron compound be present in an amount sufficient to give a boron-$SiO_2$ weight ratio of at least about 0.04 to 1 and preferably at least about 0.25 to 1.

An alkylpolysilicate and boron compound are preferably mixed for use as a primer by preparing solutions of each component in compatible liquids and mixing the solutions.

The primer can be modified by the inclusion of fillers, pigments, stabilizers, wetting agents, antioxidants and the like, if desired.

The primer is applied to a metal surface by spraying, brushing or flooding or by dipping the metal surface into the primer composition. The primer coating is then air dried. Drying can be accelerated by heating, but care must be taken that the drying of the primer coat is not so fast that escaping dispersant ruptures the primer coating.

Silicone rubber is deposited on the primed surface in any desired manner. For example, vulcanized sheets of the rubber can be applied to the surface and bonded under light pressure at temperatures up to 200° C. Alternatively, unvulcanized silicon rubber stock can be extruded, calendered, doctored or otherwise applied to the primed surface and vulcanized in the normal manner for the stock employed. The silicone rubbers employed herein are well-known; they are based on siloxane polymers containing fillers, vulcanizing agents, pigments and other known materials. Generally, if a stock based on a halogenated polymer such as 3,3,3-trifluoropropylmethylsiloxane is to be adhered to a surface, it is desirable to use a compatible primer such as a 3,3,3-trifluoropropylvinylsiloxane.

The method of this invention is useful in the preparation of surfaces on which heat-curable peroxide-containing organopolysiloxane rubbers or room-temperature-vulcanizing organopolysiloxane rubbers are to be bonded and subsequently exposed to hot oils such as in oil and bearing seals and in roll coverings.

A typical procedure using all facets of this invention consists of taking a chlorinated-solvent-cleaned, pickled and water-washed metal surface, dipping it into a hexavalent-chromium-compound solution, letting the treated surface dry, dipping the treated surface into an alkylpolysilicate-boron compound primer solution, letting the primed surface dry, applying to the primed surface a silicone rubber stock and curing the rubber by standard techniques. The resulting rubber-metal bond is strong, uniform and resistant to hot oils, even hot oils with components containing sulfur in an oxidized state, e.g. sulfonated sperm oil.

The following examples are intended not to limit but to illustrate this invention, which is properly delineated in the claims. All measurements and proportions are by weight unless otherwise noted.

*Example 1*

Steel panels which have been cleaned with a chlorinated solvent, pickled and rinsed with water are dipped into a solution made up of 75% acetone, 24.75% water and 0.25% $Na_2Cr_2O_7$ added as $Na_2Cr_2O_7 \cdot 2H_2O$ and allowed to air dry.

The resulting panels are rust resistant.

Example 2

Steel panels treated in accordance with the method of Example 1 are dipped into primer solutions made up of isopropanol (IPA), boric acid (BA) and fluid ethylpolysilicate (EPS) having about 45 weight percent $SiO_2$ units in the following proportions:

TABLE I

| Run | Percent | | |
|---|---|---|---|
| | EPS | BA | IPA |
| A | 2 | 2 | 96 |
| B | 1 | 1 | 98 |
| C | 0.5 | 0.05 | 99.45 |
| D | 1 | 2 | 97 |
| E | 2 | 0.1 | 97.9 |
| F | 2 | 0.5 | 97.5 |
| G | 1.2 | 0.8 | 98 |
| H | 1.2 | 1.8 | 97 |

The resulting specimens are air dried. Strips of an uncured standard commercial silicone rubber stock based on a dimethyl-siloxane-methylvinylsiloxane gum copolymer and containing silica filler and a peroxide vulcanizing agent are applied to the primed surfaces. These specimens are vulcanized at 330° C. at 1000 p.s.i.g. for 10 minutes and are then immersed in a commercial paraffinic oil containing between 0.5 and 5% sulfonated sperm oil. After 150 hours at 300° F. all the rubber to steel bonds are complete and strong.

Example 3

When the following alkylpolysilicates are substituted for the ethylpolysilicate in the procedure of Example 2, similar results are obtained.

Ethylpolysilicate containing 50% $SiO_2$ units
Methylpolysilicate containing 57% $SiO_2$ units
Propylpolysilicate containing 38% $SiO_2$ units

Example 4

When the following alkyl borates are substituted mol per mol for the boric acid in the procedure of Example 2, similar results are obtained.

trimethylborate
triethylborate
tripropylborate

Example 5

When two grams of ethylpolysilicate having about 45% $SiO_2$ units, four grams of trimethylborate and 94 grams of each of the following liquids are mixed together and the resulting solutions are each substituted for the primer solutions in the procedure described in Example 2, similar results are obtained.

methyl alcohol
ethyl alcohol
hexane
acetone
2-butanone
carbon tetrachloride
isopropyl bromide
isopropyl ether

Example 6

When each of the following solutions are substituted for the solution in Example 1 and the resulting treated steel panels are further treated and rubber coated in accordance with the procedure of Example 2, similar results are obtained.

TABLE II

85% acetone, 14.75% water and 0.25% $Na_2Cr_2O_7$
60% acetone, 39.75% water and 0.25% $Na_2Cr_2O_7$
60% acetone, 39.75% water and 0.25% chromic acid
75% acetone, 24.75% water and 0.25% $K_2Cr_2O_7$
75% acetone, 24.6% water and 0.4% $Na_2CrO_4$
75% acetone, 24.8% water and 0.2% $Na_2Cr_2O_7$
75% acetone, 24.5% water and 0.5% $Na_2Cr_2O_7$
70% acetone, 29% water and 1% $Na_2Cr_2O_7$
65% acetone, 32.5% water and 2.5% $Na_2Cr_2O_7$
60% acetone, 35% water and 5% $Na_2Cr_2O_7$
99.75% methyl alcohol and 0.25% $Na_2Cr_2O_7$
99.5% ethyl alcohol and 0.5% $Na_2Cr_2O_7$
99.75% isopropyl alcohol and 0.25% $Na_2Cr_2O_7$
90% ethyl alcohol, 9.75% ethyl ether and 0.25% $Na_2Cr_2O_7$
90% ethyl alcohol, 9.75% 2-butanone and 0.25% $Na_2Cr_2O_7$
90% ethyl alcohol, 9.75% furan and 0.25% $Na_2Cr_2O_7$
90% ethyl alcohol, 9.75% hexane and 0.25% $Na_2Cr_2O_7$
90% ethyl alchol, 9.75% ethyl bromide and 0.25% $Na_2Cr_2O_7$
99.75% tetrahydropyran and 0.25% $Na_2Cr_2O_7$

Example 7

When each of the following panels are treated sequentially in accordance with the procedures of Examples 1 and 2, similar results are obtained.

zinc-coated steel
tin-coated steel
aluminum
glass

Example 8

When the following primers are substituted for the primer solutions employed in Example 2, the ultimate rubber coated specimens have some oil resistance and excellent adhesion prior to immersion in the hot oil.

Ethylpolysilicate fluid containing 48 weight percent $SiO_2$ units
A solution of 2% of the above ethylpolysilicate and 98% isopropanol
A solution of 10% of the above ethylpolysilicate and 90% isopropanol

Example 9

When the following silicone rubber stocks are applied as a paste to the primed panels in Example 2 in place of the strips of peroxide-curable stock and the stocks are allowed to cure completely at room temperature, the resulting rubber to steel bonds are complete and strong even after the hot oil immersion test.

A standard commercial one component room temperature vulcanizing stock in which the primary active ingredient of a dimethylpolysiloxane gum, each polymer of which contains at least two acetoxy groups at each end.

A standard commercial two component room temperature vulcanizing stock containing a hydroxyl-endblocked dimethylpolysiloxane fluid of high molecular weight, a silicate cross-linking agent, a silica filler and stannous octoate catalyst.

Example 10

When the runs of Example 2 are performed on untreated aluminum and glass panels instead of the treated steel panels, similar results are obtained.

Having thus described our invention, we claim:

1. A composition consisting essentially of (a) a liquid alkylpolysilicate in which each of the alkyl groups contains up to 12 carbon atoms, said alkylpolysilicate containing at least 32 mol percent $SiO_2$ units being present in an amount of from 0.1 to 10 percent by weight polysilicate measured as ethylpolysilicate (b) a boron compound selected from the group consisting of boric acid and alkyl borate in which each of the alkyl groups contains up to about 3 carbon atoms, said boron compound being present in an amount equivalent to from 0.04 to 0.9 part by weight of boron per part by weight of $SiO_2$ in (a), and (c) a solvent for (a) and (b).

2. The composition of claim 1 wherein each of the alkyl groups of the alkylpolysilicate contain from 2 to 3 carbon atoms and the boron compound is boric acid.

3. The composition of claim 2 wherein the weight ratio of boron to $SiO_2$ ranges from 0.25:1 to 0.6:1.

4. The method comprising (1) applying to a metal surface a solvent solution having a pH at least 3 and containing from about 0.05 to about 2 percent by weight based on the weight of the solution of chromium added as a hexavalent chromium compound soluble in said solvent, said solvent having a boiling point less than about 90° C., (2) allowing the surface to dry, (3) applying to the resulting surface a liquid consisting essentially of (a) a liquid alkylpolysilicate in which each of the alkyl groups contains up to 12 carbon atoms, said alkylpolysilicate containing at least 32 mol percent $SiO_2$ units and being present in an amount of from 0.1 to 10 percent by weight measured as ethylpolysilicate; (b) a boron compound selected from the group consisting of boric acid and alkyl borates in which each of the alkyl groups contains up to about 3 carbon atoms, said boron compound being present in an amount equivalent to from 0.04 to 0.9 part by weight of boron per part by weight of $SiO_2$ in (a), and (c) a solvent for (a) and (b), and (4) allowing the surface to dry.

5. The method comprising (1) applying to a metal surface a solvent solution having a pH of from 4 to 8 and containing from about 0.05 to about 1 percent by weight based on the weight of the solution of chromium added as an alkali metal dichromate, said solvent having a boiling point less than about 90° C., (2) allowing the surface to dry, (3) applying to the resulting surface a solvent solution of (a) from about 0.5 to about 2 percent by weight a liquid ethylpolysilicate containing at least 33 mol percent $SiO_2$ units and (b) boric acid in an amount equivalent to from 0.25 to 0.6 part by weight boron per part of $SiO_2$ in (c) a mutual solvent for (a) and (b) and (4) allowing the surface to dry.

6. The method comprising (1) applying to a metal surface a solvent solution having a pH of at least 3 and containing from about 0.05 to about 2 percent by weight based on the weight of the solution of chromium added as a hexavalent chromium compound soluble in said solvent, said solvent having a boiling point less than about 90° C., (2) allowing the surface to dry, (3) applying to the resulting surface a primer for silicone rubber, said primer being a composition consisting essentially of (a) a liquid alkylpolysilicate in which each of the alkyl groups contains up to 12 carbon atoms, said alkylpolysilicate containing at least 32 mol percent $SiO_2$ units and being present in an amount of from 0.1 to 10 percent by weight measured as ethylpolysilicate; (b) a boron compound selected from the group consisting of boric acid and alkyl borates in which each of the alkyl groups contains up to about 3 carbon atoms, said boron compound being present in an amount equivalent to from 0.04 to 0.9 parts by weight of boron per part by weight of $SiO_2$ in (a), and (c) a solvent for (a) and (b), (4) allowing the primed surface to dry, (5) applying to the dry primed surface a curable silicone rubber and (6) curing said silicone rubber.

7. The method of claim 6 wherein the hexavalent chromium compound is an alkali metal dichromate.

8. The method comprising (1) applying to a metal surface a solvent solution having a pH of from 4 to 8 and containing from about 0.05 to about 1 percent by weight based on the weight of the solution of chromium added as an alkali metal dichromate, said solvent having a boiling point less than about 90° C., (2) allowing the surface to dry, (3) applying to the resulting surface a solvent solution of (a) from about 0.5 to about 2 percent by weight a liquid ethylpolysilicate containing at least 33 mol percent $SiO_2$ units and (b) boric acid in an amount equivalent to from 0.25 to 0.6 part by weight boron per part of $SiO_2$ in (c) a mutual solvent for (a) and (b), (4) allowing the surface to dry, (5) applying to the dry surface a curable silicone rubber and (6) curing said silicone rubber.

References Cited

UNITED STATES PATENTS

| | | | |
|---|---|---|---|
| 2,517,945 | 8/1950 | Upson | 260—2 |
| 2,751,314 | 6/1956 | Keil | 117—75 |
| 2,799,693 | 7/1957 | Dodgson | 260—2 |
| 2,851,386 | 9/1958 | Hartman | 148—6.2 |
| 2,859,144 | 11/1958 | Jeremias | 148—6.2 |
| 3,050,490 | 8/1962 | Nitzsche et al. | 117 |
| 3,108,898 | 10/1963 | Nitzsche et al. | 117—75 |

ALFRED L. LEAVITT, *Primary Examiner.*

RALPH S. KENDALL, *Examiner.*

J. R. BATTEN, Jr., A. H. ROSENSTEIN,
*Assistant Examiners.*